United States Patent [19]

Fisher

[11] 3,852,333

[45] Dec. 3, 1974

[54] NEW ANTHRANILIC ACID α-MONOGLYCERIDES

[75] Inventor: James R. Fisher, Royal Oak, Mich.

[73] Assignee: Parke, Davis & Company, Detroit, Mich.

[22] Filed: Oct. 23, 1967

[21] Appl. No.: 677,051

[52] U.S. Cl............ 260/471 R, 260/340.9, 424/310
[51] Int. Cl.......................................... C07c 101/54
[58] Field of Search ................................. 260/471 R

[56] References Cited
UNITED STATES PATENTS
3,413,313  11/1968  Scherrer .......................... 260/471
3,511,872  5/1970  Sherlock ........................... 260/471

OTHER PUBLICATIONS

Finar, I. L., Organic Chemistry, (1963), Vol. I, pub. by Longmans, page 253, QD 251 F56.

*Primary Examiner*—Lorraine A. Weinberger
*Assistant Examiner*—L. Arnold Thaxton

[57] ABSTRACT

The α-monoglycerides of N-(α, α, α-trifluoro-m-tolyl)anthranilic acid, N-(2,3-xylyl)anthranilic acid, and N-(2,6-dichloro-m-tolyl)anthranilic acid, useful as pharmacological agents having anti-inflammatory activity, and their production by (a) reacting one of the named anthranilic acids or a carboxylate salt thereof with a 3-halo-1,2-propanediol; and (b) reacting a (1,3-dioxolan-4-yl)methyl ester of one of the named anthranilic acids with a strong acid, whereby the dioxolane ring is cleaved.

2 Claims, No Drawings

NEW ANTHRANILIC ACID α-MONOGLYCERIDES

SUMMARY AND DETAILED DESCRIPTION

The present invention relates to new anthranilic acid ester compounds that are useful as pharmacological agents and to methods for their production. More particularly, the invention relates to new anthranilic acid α-monoglycerides having the formula

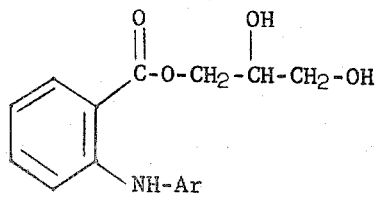

I where Ar is α,α,α-trifluoro-m-tolyl, 2,3-xylyl, or 2,6-dichloro-m-tolyl.

In accordance with the invention, compounds having the foregoing formula are produced by reacting an anthranilic acid compound having the formula,

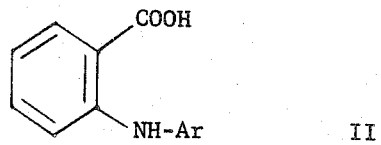

II or a carboxylate salt thereof, with a 3-halo-1,2-propanediol compound having the formula

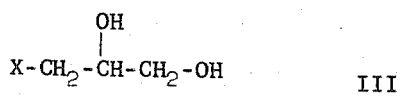

III where X is halogen and Ar is as defined previously. When the free anthranilic acid compound having formula II above is used as a reactant, the reaction is preferably carried out in the presence of at least an equivalent amount of a base. Suitable bases for this purpose include alkali metal hydroxides, alkali metal carbonates, alkaline earth metal hydroxides, alkali metal alkoxides, various amine bases, such as diethylamine, triethylamine, and pyridine, and in a non-hydroxylic solvent, alkali metal hydrides. Examples of carboxylate salts that may be used as reactants are the sodium, potassium, lithium, calcium, magnesium, ammonium, diethylamine, triethylamine, and pyridine salts. The reaction of either the free anthranilic acid or a carboxylate salt thereof is best carried out in an unreactive water-miscible solvent medium, although added solvent may be unnecessary if 3-chloro-1,2-propanediol is employed as the second reactant in large excess. Suitable solvents include lower alkanols, water, tetrahydrofuran, dioxane, ethylene glycol, N,N-dimethylformamide, and mixtures of these. A preferred solvent is 95 percent ethanol. The temperature and duration of the reaction are not especially critical and may be varied widely, the temperature between about 50° and about 150° C., and the duration between about 2 and about 48 hours. In a lower alkanol solvent medium, the reaction is most conveniently carried out at the reflux temperature of the reaction mixture for a period that may vary between 24 and 48 hours. In excess 3-chloro-1,2-propanediol the reaction is essentially complete after 3–6 hours at a temperature between 100° and 150°C. The ratio of reactants is not critical and an excess of either the anthranilic acid reactant or the 3-halo-1,2-propanediol reactant may be used.

When a carboxylate salt is used as a reactant in the foregoing process, the required salt is prepared by reacting the free anthranilic acid with an equivalent amount of a suitable base in an unreactive solvent, evaporating the resulting mixture to dryness, and isolating and drying the salt obtained, which may then be used directly in the reaction described above.

Also in accordance with the invention, compounds having formula I above are produced by reacting a dioxolane compound having the formula

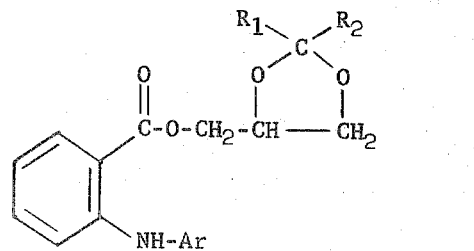

IV with a strong acid; where Ar has the aforementioned significance, and each of $R_1$ and $R_2$ is hydrogen or lower alkyl, preferably methyl. Some examples of suitable strong acids that may be used in the reaction are the mineral acids, hydrochloric, sulfuric, phosphoric, and nitric, formic acid, and boric acid, as well as mixtures of these. The amount of acid used is not especially critical, and it is possible to carry out the reaction successfully using only a catalytic amount. In general, however, it is best to employ an excess of the strong acid reagent. The reaction is advantageously carried out in an unreactive solvent medium. Suitable solvents for this purpose include lower alkanols, such as methanol and ethanol, ethers, such as dioxane, 2-methoxyethanol, ethylene glycol, and N,N-dimethylformamide. When a mineral acid is used in the reaction, a lower alkanol is the preferred solvent. With boric acid, a preferred solvent is 2-methoxyethanol. The reaction is best carried out at a temperature between about 60° and about 125°C., and at this temperature is essentially complete after a period that may vary from about 10 minutes to 2 hours. To avoid acid hydrolysis of the desired anthranilic acid α-monoglyceride product, the reaction mixture containing a mineral acid should not be heated for periods longer than about 2 hours.

The dioxolane compounds having formula IV above that are used as starting materials in the foregoing process can be prepared by first reacting an anthranilic acid compound having formula II above with a halogenating agent, such as thionyl chloride, to give the corresponding anthranilic acid halide intermediate, which is then reacted with a dioxolane derivative of glycerine having the formula

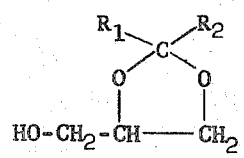

V in the presence of an acid acceptor to give the desired starting material; where $R_1$ and $R_2$ have the same meaning as given previously.

The compounds of the invention are new chemical compounds that are useful as pharmacological agents, especially as anti-inflammatory agents. As such, they are of value in mitigating the symptoms associated with inflammatory conditions, as well as in preventing or suppressing the occurrence of inflammation. Their anti-inflammatory activity is demonstrable and quantitatively measurable in a test designed to measure the ability of a test compound to delay the normal appearance of an erythema in animals exposed to ultraviolet radiation under standardized conditions. The test procedure that is used has been described by Winder, Wax, Burr, Been, and Rosiere in *Archives Internationales de Pharmacodynamie et de Therapie*, Vol. 116, pages 261–292, 1958. This test has been found to be a reliable indicator of anti-inflammatory activity, as demonstrated, for example, for the known clinically useful agents, aminopyrine, antipyrine, and aspirin. In this standard test procedure, 2,3-dihydroxypropyl N-(2,3-xylyl)anthranilate, the compound of Example 2 herein, was found to be effective at a dose of 12.5 mg./kg. The compounds of the invention may be administered orally or parenterally. Oral administration is preferred, however, because they can readily be made up in the form of aqueous suspensions that are virtually tasteless.

The invention is illustrated by the following examples.

EXAMPLE 1

A stirred mixture consisting of 56.3 g. of N-($\alpha,\alpha,\alpha$-trifluoro-m-tolyl)anthranilic acid, 150 g. of 3-chloro-1,2-propanediol, and 28.5 ml. of triethylamine is slowly heated to 140°–150°C. and is kept at that temperature for 5.5 hours. Upon cooling, the mixture is poured into 300 ml. of water, and the resulting aqueous mixture is extracted with ether. The ether extract is washed successively with water, with 0.5 N sodium hydroxide, and with saturated aqueous sodium chloride, and dried over anhydrous magnesium sulfate. After filtration to remove the drying agent, the ethereal solution is evaporated under reduced pressure to give a residue of 2,3-dihydroxypropyl N-($\alpha,\alpha,\alpha$-trifluoro-m-tolyl)anthranilate. This solid residue is extracted a number of times with boiling cyclohexane, the insoluble material is discarded, and the combined cyclohexane extracts are cooled to give the desired product, m.p. 85°–90°C.

EXAMPLE 2

A mixture consisting of 21.6 g. of sodium n-(2,3-xylyl)anthranilate, 16.0 g. of 3-iodo-1,2-propanediol, and 100 ml. of 95 percent ethanol is heated under reflux for 48 hours and then evaporated to dryness under reduced pressure. The yellow syrupy residue that is obtained is mixed well with 150 ml. of water, and the aqueous mixture is cooled at 0°–5°C. for several days. The solid 2,3-dihydroxypropyl N-(2,3-xylyl)anthranilate product that precipitates at the end of this time is isolated, washed with water, dried, and crystallized from cyclohexane; m.p. 104°–105.5°C.

In the foregoing procedure, the same product is obtained with the substitution of 12.2 g. of 3-bromo-1,2-propanediol for the 3-iodo-1,2-propanediol.

EXAMPLE 3

A mixture consisting of 13.8 g. of (2,2-dimethyl-1,3-dioxolan-4-yl)methyl N-($\alpha,\alpha,\alpha$-trifluoro-m-tolyl)anthranilate, 20 g. of boric acid, and 60 ml. of 2-methoxyethanol is heated on a steam bath for one hour, cooled, and mixed with 150 ml. of ether. The ethereal mixture is washed successively with two 150 ml. portions of saturated aqueous sodium chloride, with 0.25 N sodium hydroxide, and with aqueous sodium chloride until it is free of alkali. The solution is then dried, concentrated under reduced pressure, and the yellow syrupy residue that is obtained is dissolved in 125 ml. of boiling cyclohexane. From this solution, after standing at room temperature for an extended period, there is obtained a crystalline precipitate of 2,3-dihydroxypropyl N-($\alpha,\alpha,\alpha$-trifluoro-m-tolyl)anthranilate, which is isolated and purified by successive crystallizations, first from a mixture consisting of 15 ml. of ethyl acetate, 35 ml. of cyclohexane, and 50 ml. of isooctane, and then from aqueous methanol; m.p. 94°–95°C.

The starting material used in the foregoing procedure is obtained as follows. To a well-stirred suspension of 437 g. of N-($\alpha,\alpha,\alpha$-trifluoro-m-tolyl)anthranilic acid in 2400 ml. of purified petroleum benzin is slowly added a solution of 119 ml. of thionyl chloride in 100 ml. of purified petroleum benzin, and the resulting mixture is slowly heated to the reflux temperature and kept there for 5 hours. Upon cooling, the mixture is filtered, and the filtrate is chilled to precipitate N-($\alpha,\alpha,\alpha$-trifluoro-m-tolyl)anthraniloyl chloride, which is isolated and dried; m.p. 62.5° to 63.5°C. To a mixture consisting of 30.0 g. of this acid chloride intermediate, 13.2 g. of DL-isopropylidene glycerol, and 150 ml. of dry acetone is slowly added 14.0 ml. of triethylamine. The resulting mixture is heated under reflux for 4 hours, cooled, filtered, and the filtrate is evaporated under reduced pressure. The oily residue is then dissolved in 200 ml. of ether, and the ethereal solution is washed successively with saturated aqueous sodium chloride, with 0.5 N sodium hydroxide, and with saturated aqueous sodium chloride until it is free of alkali. After drying over anhydrous sodium sulfate, the solution is evaporated to dryness to give the desired (2,2-dimethyl-1,3-dioxolan-4-yl)methyl N-($\alpha,\alpha,\alpha$-trifluoro-m-tolyl)anthranilate starting material, obtained as a yellow oil that is suitable for use without further purification.

EXAMPLE 4

Concentrated hydrochloric acid (1.6 ml.) is added dropwise to a mixture consisting of 17.0 g. of (2,2-dimethyl-1,3-dioxolan-4-yl)methyl N-(2,6-dichloro-m-tolyl)anthranilate and 50 ml. of ethanol, and the resulting solution is heated under reflux for 20 minutes. Upon cooling, the solution is diluted with 100 ml. of water, and the aqueous mixture is extracted with ether. The ether extract is washed successively with saturated aqueous sodium chloride, with 0.5 N sodium hydroxide, and with saturated aqueous sodium chloride until it is free of alkali. It is then dried and evaporated, and the syrupy residue is washed with hot cyclohexane and purified by chromatography on a silica plate employing a solvent mixture that consists of 50 parts of benzene, 50 parts of ether, and one part of acetic acid for chromatographic separation and employing ether for elution. The ether eluates are combined and evaporated to yield 2,3-dihydroxypropyl N-(2,6-dichloro-m- tolyl)anthranilate, obtained as a gummy solid. The infrared absorption spectrum of this product shows maxima at 3,322 cm.$^{-1}$ and at 1,692 cm.$^{-1}$. The ultraviolet absorption spectrum, obtained in a mixture of 95 percent methanol and 0.01 N hydrochloric acid, shows the following maxima: $\lambda_{338}$ $E_1^1$ 198; $\lambda_{277}$ $E_1^1$ 167; $\lambda_{243}$ $E_1^1$ 271.

The starting material used above is obtained as follows. A mixture consisting of 148.1 g. of N-(2,6-dichloro-m-tolyl)anthranilic acid, 80 ml. of thionyl chloride and 500 ml. of benzene is stirred and heated under reflux for 2 hours, distilled to remove solvent and excess thionyl chloride, and the solid residue of N-(2,6-dichloro-m-tolyl)anthraniloyl chloride that is obtained is isolated and crystallized from purified petroleum benzin; m.p. 121°–123°C. This acid chloride intermediate is then reacted with DL-isopropylidene glycerol in dry acetone in the presence of triethylamine, in a manner analogous to that described in the foregoing example, to give (2,2-dimethyl-1,3-dioxolan-4-yl)methyl N-(2,6-dichloro-m-tolyl) anthranilate; m.p. 88.5°–91.5°C., following purification by washing with purified petroleum benzin and crystallizing from isooctane.

I claim:
1. A compound which is 2,3-dihydroxypropyl N-(2,3-xylyl)anthranilate.
2. A compound which is 2,3-dihydroxypropyl N-(2,6-dichloro-m-tolyl)anthranilate.

* * * * *